(12) United States Patent
Bang et al.

(10) Patent No.: US 10,959,264 B2
(45) Date of Patent: Mar. 23, 2021

(54) METHOD FOR TRANSMITTING FRAME IN WIRELESS LAN SYSTEM AND WIRELESS TERMINAL USING SAME

(71) Applicant: LG ELECTRONICS INC., Seoul (KR)

(72) Inventors: Saehee Bang, Seoul (KR); Hangyu Cho, Seoul (KR); Kiseon Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

(21) Appl. No.: 16/318,688

(22) PCT Filed: Jul. 19, 2017

(86) PCT No.: PCT/KR2017/007755
§ 371 (c)(1),
(2) Date: Jan. 17, 2019

(87) PCT Pub. No.: WO2018/016864
PCT Pub. Date: Jan. 25, 2018

(65) Prior Publication Data
US 2019/0289636 A1    Sep. 19, 2019

Related U.S. Application Data

(60) Provisional application No. 62/363,855, filed on Jul. 19, 2016, provisional application No. 62/364,338, filed on Jul. 20, 2016.

(51) Int. Cl.
*H04W 74/08* (2009.01)
*H04W 84/12* (2009.01)

(52) U.S. Cl.
CPC ....... *H04W 74/0808* (2013.01); *H04W 74/08* (2013.01); *H04W 84/12* (2013.01)

(58) Field of Classification Search
None
See application file for complete search history.

(56) References Cited

U.S. PATENT DOCUMENTS

| 8,824,610 B1 | 9/2014 | Salhotra et al. |
| 2005/0025176 A1* | 2/2005 | Ko ...................... H04W 74/085 370/448 |

(Continued)

FOREIGN PATENT DOCUMENTS

| KR | 20120130110 | 11/2012 |
| WO | 2015156616 | 10/2015 |

OTHER PUBLICATIONS

PCT International Application No. PCT/KR2017/007755, International Search Report dated Oct. 23, 2017, 4 pages.

(Continued)

*Primary Examiner* — Kodzovi Acolatse
*Assistant Examiner* — The Hy Nguyen
(74) *Attorney, Agent, or Firm* — Lee Hong Degerman Kang Waimey

(57) ABSTRACT

A method for transmitting a frame in a wireless LAN system, according to one embodiment of the present specification, comprises the steps of: a wireless terminal determining whether a channel is usable based on directional CCA which confirms the state of individual channels; determining, as a primary AC, the first AC type from a plurality of AC types to complete a first back-off process, when either a first channel or a second channel is determined as usable; and determining a primary AC from the plurality of AC types once again by performing a second back-off process, when transmission of traffic data included in a transmission que corresponding to the primary AC using at least one directional antenna module associated with at least one channel is determined to be impossible.

8 Claims, 10 Drawing Sheets

(56) References Cited

U.S. PATENT DOCUMENTS

| 2012/0008490 | A1* | 1/2012 | Zhu | H04B 7/0452 |
| | | | | 370/216 |
| 2016/0050684 | A1* | 2/2016 | Ni | H04W 72/1205 |
| | | | | 370/329 |
| 2016/0135189 | A1 | 5/2016 | Chandrasekhar et al. | |
| 2017/0265221 | A1* | 9/2017 | Yang | H04B 7/0617 |

OTHER PUBLICATIONS

Hassan Aboubakr Omar, et al.,"A Survey on High Efficiency Wireless Local Area Networks: Next Generation Wifi", IEEE Communications Surveys & Tutorials, vol. 18, Issue: 4, pp. 2315-2344, Apr. 2016, 32 pages.

* cited by examiner

FIG. 1
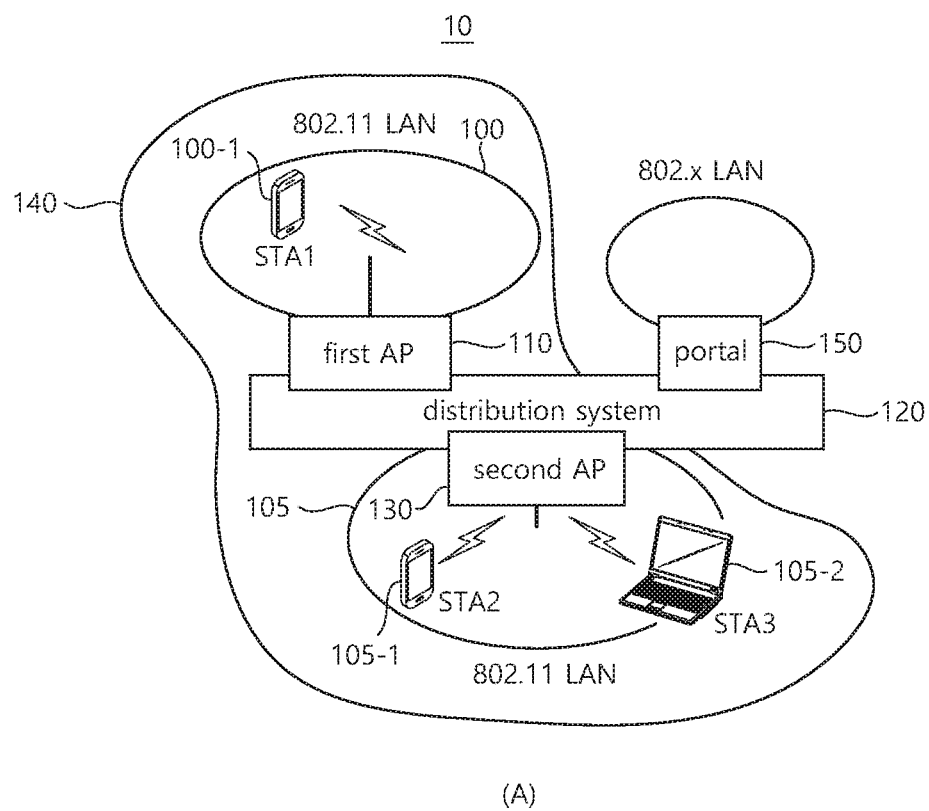
(A)
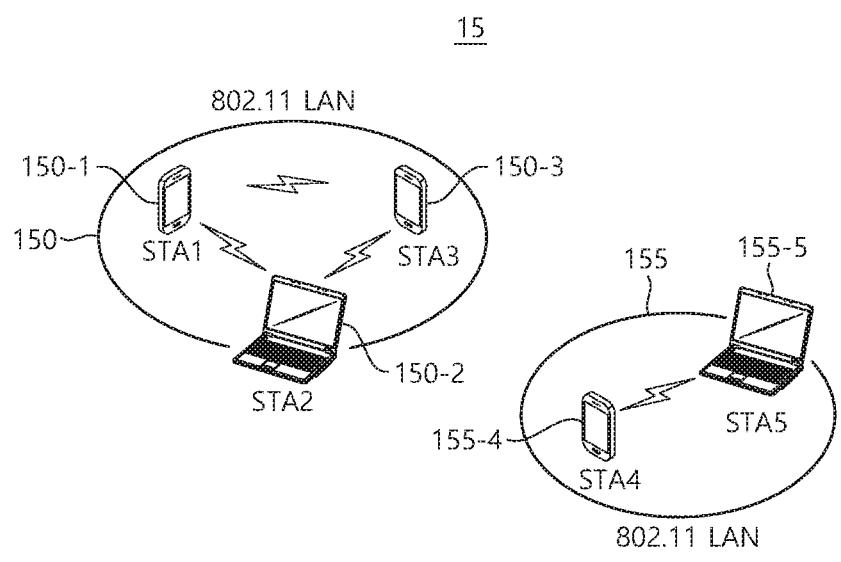
(B)

METHOD FOR TRANSMITTING FRAME IN WIRELESS LAN SYSTEM AND WIRELESS TERMINAL USING SAME

CROSS-REFERENCE TO RELATED APPLICATIONS

This application is the National Stage filing under 35 U.S.C. 371 of International Application No. PCT/KR2017/007755, filed on Jul. 19, 2017, which claims the benefit of U.S. Provisional Application Nos. 62/363,855, filed on Jul. 19, 2016, and 62/364,338, filed on Jul. 20, 2016, the contents of which are all hereby incorporated by reference herein in their entireties.

BACKGROUND OF THE INVENTION

Field of the Invention

This specification relates to wireless communication and, most particularly, to a method for transmitting a frame in a wireless LAN (WLAN) system and a wireless terminal using the same.

Related Art

Institute of Electrical and Electronics Engineers (IEEE) 802.11ad standard is ultra-high speed wireless communication standard operating in a band higher than 60 GHz. The coverage of a signal is about 10 meters, and meanwhile, throughput of more than 6 GHz is supportable. Since it operates high frequency band, signal propagation is dominated by ray-like propagation. As a transmitted (TX) or received (RX) antenna beam is aligned toward a strong spatial signal path, a signal quality can be improved.

IEEE 802.11ad standard provides beamforming training procedure for antenna beam alignment. IEEE 802.11ay is next generation standard which is being developed in a target of throughput of 20 Gbps or more based on IEEE 802.11ad standard.

SUMMARY OF THE INVENTION

Technical Objects

An object of this specification is to provide a method for transmitting a frame in a wireless LAN (WLAN) system having a more enhanced capability (or performance) and a wireless terminal (or device) using the same.

Technical Solutions

This specification relates to a method for transmitting a frame in a wireless LAN system. The method for transmitting a frame in a wireless LAN system according to an exemplary embodiment of this specification includes the steps of determining, by a wireless device including a first directional antenna module being associated with a first channel for a first user device and a second directional antenna module being associated with a second channel for a second user device, whether or not a channel is capable of being used based on a directional clear channel assessment (CCA) for separately checking channel statuses, if it is determined that at least one of the first channel and the second channel is capable of being used, determining, by the wireless device, an access category (AC) type that first completes a first backoff procedure from a plurality of AC types as a primary AC, determining, by the wireless device, whether or not traffic data being included in a transmission queue corresponding to the primary AC is capable of being transmitted by using at least one directional antenna module that is associated with the at least one channel, and, if it is determined that the traffic data is not capable of being transmitted, determining, by the wireless device, the primary AC once again from the plurality of AC types by performing a second backoff procedure.

Effects of the Invention

According to an exemplary embodiment of this specification, provide herein is a method for transmitting a frame in a wireless LAN (WLAN) system having a more enhanced capability (or performance) and a wireless terminal (or device) using the same.

BRIEF DESCRIPTION OF THE DRAWINGS

FIG. 1 is a conceptual view illustrating the structure of a wireless local area network.

DESCRIPTION OF EXEMPLARY EMBODIMENTS

Figure 2:
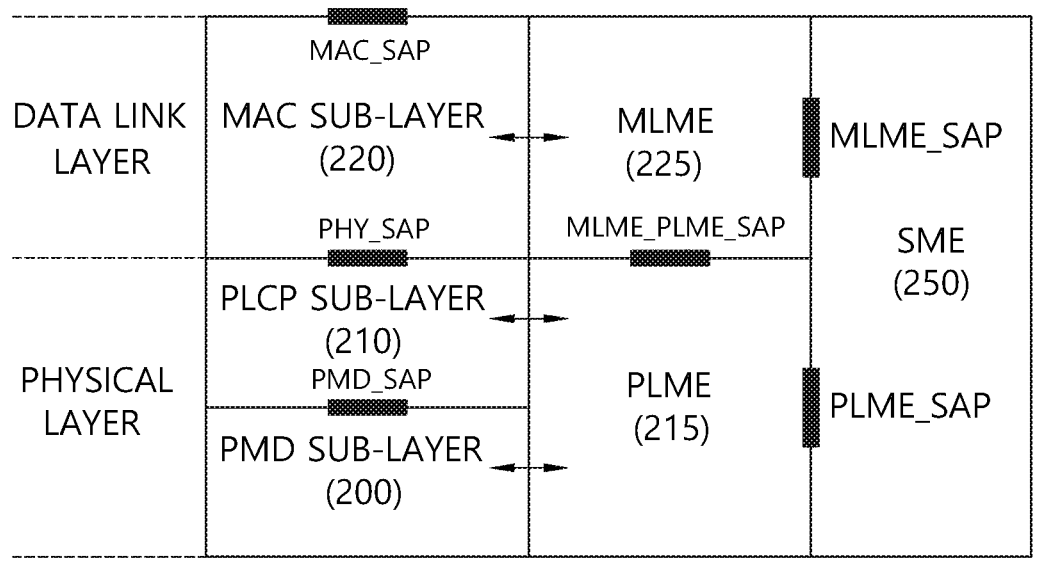
FIG. 2 is a conceptual view illustrating a layered architecture of a WLAN system supported by IEEE 802.11.

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only and is not intended to limit the concept of the present specification. Further, embodiments described to help understanding of the invention also include complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

FIG. 1 is a conceptual view illustrating the structure of a wireless local area network. (A) of FIG. 1 illustrates the structure of an infrastructure basic service set (BSS) of institute of electrical and electronic engineers (IEEE) 802.11.

Referring to (A) of FIG. 1, the WLAN system (10) shown in (A) of FIG. 1 may include one or more infrastructure BSSs (100, 105) (hereinafter, referred to as BSS). The BSSs (100, 105) as a set of an AP and an STA such as an access point (AP) (125) and a station (STA1) (100-1) which are successfully synchronized to communicate with each other are not concepts indicating a specific region.

For example, the BSS (100) may include one AP (110) and one or more STAs (100-1) which may be related with one AP (110). The BSS (105) may include one or more STAs (105-1, 105-2) which may be related with one AP (130).

The infrastructure BSS (100, 105) may include at least one STA, APs (125, 130) providing a distribution service, and a distribution system (DS) (120) connecting multiple APs.

The distribution system (120) may implement an extended service set (ESS) (140) extended by connecting the multiple BSSs (100, 105). The ESS (140) may be used as a term indicating one network configured by connecting one or more APs (110, 130) through the distribution system (120). The AP included in one ESS (140) may have the same service set identification (SSID).

A portal (150) may serve as a bridge which connects the wireless LAN network (IEEE 802.11) and another network (e.g., 802.X).

In the BSS illustrated in (A) of FIG. 1, a network between the APs (110, 130) and a network between the APs (110, 130) and the STAs (100-1, 105-1, 105-2) may be implemented.

(B) of FIG. 1 illustrates a conceptual view illustrating the IBSS. Referring to (B) FIG. 1, a WLAN system (15) shown in (B) of FIG. 1 may be capable of performing communication by configuring a network between STAs in the absence of the APs (110, 130) unlike in (A) of FIG. 1. When communication is performed by configuring the network also between the STAs in the absence of the AP (110, 130), the network is defined as an ad-hoc network or an independent basic service set (IBSS).

Referring to (B) of FIG. 1, the IBSS is a BSS that operates in an Ad-Hoc mode. Since the IBSS does not include the access point (AP), a centralized management entity that performs a management function at the center does not exist. That is, in the IBSS (15), STAs (150-1, 150-2, 150-3, 155-4, 155-5) are managed by a distributed manner.

In the IBSS, all STAs (150-1, 150-2, 150-3, 155-4, 155-5) may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or simply a user.

FIG. 2 is a conceptual view illustrating a layered architecture of a WLAN system supported by IEEE 802.11. Referring to FIG. 2, the layered architecture of the WLAN system may include a physical medium dependent (PMD) sub-layer (200), a physical layer convergence procedure (PLCP) sub-layer (210), and a medium access control (MAC) sub-layer (220).

The PLCP sub-layer (200) may serve as a transmission interface for transmitting/receiving data between a plurality of STAs. The PLCP sub-layer (210) is implemented such that the MAC sub-layer (220) is operated with a minimum dependency with respect to the PMD sub-layer (200).

The PMD sub-layer (200), the PLCP sub-layer (210), and the MAC sub-layer (220) may conceptually include respective management entities. For example, the management entity of the MAC sub-layer (220) is referred to as a MAC layer management entity (MLME) (225). The management entity of the physical layer is referred to as a PHY layer management entity (PLME) (215).

The management entities may provide an interface for performing a layer management operation. For example, the PLME (215) may be connected to the MLME (225) to perform a management operation of the PLCP sub-layer (210) and the PMD sub-layer (200). The MLME (225) may be connected to the PLME (215) to perform a management operation of the MAC sub-layer (220).

An STA management entity (SME) (250) may exist to perform a proper MAC layer operation. The SME (250) may be operated as a constitutional element independent of each layer. The PLME (215), the MLME (225), and the SME (250) may mutually transmit and receive information on the basis of a primitive.

The operation of each sub-layer is briefly described as follows. For example, the PLCP sub-layer (210) delivers a MAC protocol data unit (MPDU) received from the MAC sub-layer (220) according to an instruction of the MAC layer between the MAC sub-layer (220) and the PMD sub-layer (200) to the PMD sub-layer (200) or delivers a frame from the PMD sub-layer (200) to the MAC sub-layer (220).

The PMD sub-layer (200) is a PLCP sub-layer and may transmit and receive data between a plurality of STAs through a wireless medium. The MPDU delivered from the MAC sub-layer (220) is referred to as a physical service data unit (PSDU) in the PLCP sub-layer (210). Although the MPDU is similar to the PSDU, if an aggregated MPDU (AMPDU) obtained by aggregating a plurality of MPDUs is delivered, the MPDUs may be individually different from the PSDUs.

The PLCP sub-layer (210) adds an additional field including information required by a transceiver of a physical layer in a process of receiving the PSDU from the MAC sub-layer (220) and delivering it to the PMD sub-layer (200). In this case, the field added to the PSDU may be a PLCP preamble, a PLCP header, and tail bits required to return a convolution encoder to a zero state.

The PLCP sub-layer (210) adds the aforementioned fields to the PSDU to generate a PLCP protocol data unit (PPDU)

and transmits the PPDU to a receiving station through the PMD sub-layer (200). The receiving station receives the PPDU to perform restoration by obtaining information required to restore data from the PLCP preamble and the PLCP header.

Figure 3:
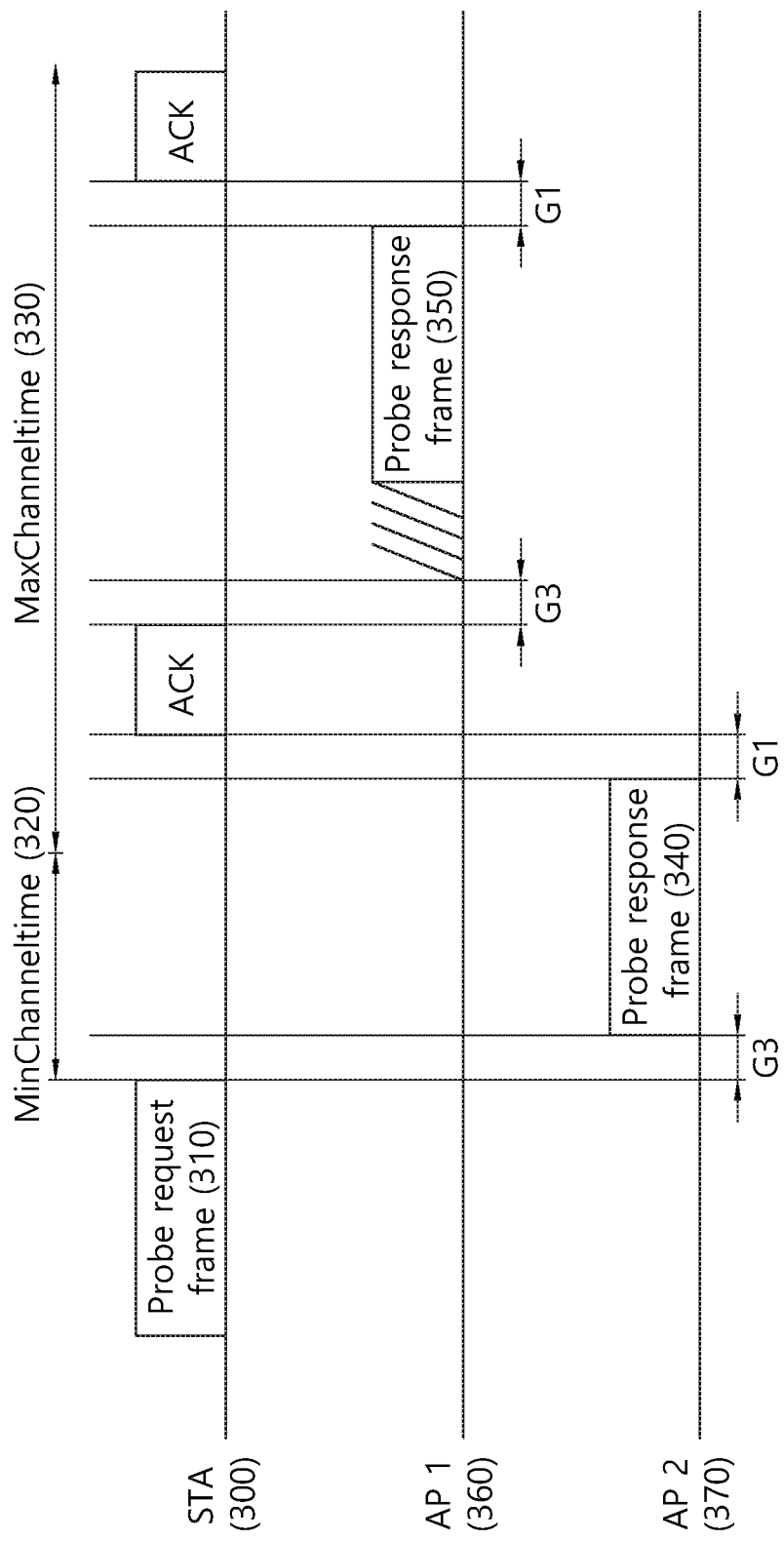
FIG. 3 is a concept view illustrating an active scanning procedure.

FIG. 3 is a concept view illustrating an active scanning procedure.

Referring to FIG. 3, the active scanning procedure may be performed in the following steps.

(1) It is determined whether the STA (300) is ready to perform the scanning procedure.

The STA (300) may wait, e.g., until the probe delay time expires or particular signaling information (for example, PHY-RXSTART.indication primitive) is received to perform active scanning.

The probe delay time is a delay that occurs before the STA (300) sends a probe request frame (310) when performing active scanning PHY-RXSTART.indication primitive is a signal that is transmitted from the physical (PHY) layer to the local medium access control (MAC) layer. PHY-RXSTART.indication primitive may signal information indicating that the physical layer convergence protocol (PLCP) has received a PLCP protocol data unit (PPDU) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA (300) may transmit the probe request frame (310) to the APs (360, 370) using a basic access method.

(3) Information for specifying the APs (360, 370) included in MLME-SCAN.request primitive (for example, service set identification (SSID) and basic service set identification (BSSID) information) may be included in the probe request frame (310) and may be transmitted.

The BSSID may have a value corresponding to the MAC address of the AP as an indicator to specify the AP. The service set identification (SSID) is a network term for specifying an AP, which may be read by a person who operates the STA. The BSSID and/or SSID may be used to specify an AP.

The STA (300) may specify an AP based on the information to specify the APs (360, 370) included by MLME-SCAN.request primitive. The specified APs (360, 370) may send the probe response frames (350, 350) to the STA (300). The STA (300) may include the SSID and BSSID information in the probe request frame (310) and send the same, thereby unicasting, multicasting, or broadcasting the probe request frame (310). A method of unicasting, multicasting, or broadcasting the probe request frame (310) using the SSID and BSSID information is further described with reference to FIG. 5.

For example, in case an SSID list is included in MLME-SCAN.request primitive, the STA (300) may include the SSID list in the probe request frame (310) and transmit the same. The APs (360, 370) may receive the probe request frame (310), determine the SSIDs included in the SSID list contained in the received probe request frame (310), and determine whether to send the probe response frames (350, 350) to the STA (300).

(4) A probe timer is initialized as 0 and is then operated.

The probe timer may be used to check a minimum channel time (MinChanneltime) (320) and a maximum channel time (MaxChanneltime) (330). The minimum channel time (320) and the maximum channel time (330) may be used to control the active scanning operation of the STA (300).

The minimum channel time (320) may be used to perform the operation for varying the channel for conducting active scanning. For example, in case the STA (300) fails to receive the probe response frames (340, 350) until the probe timer reaches the minimum channel time (320), the STA (300) shifts scanning channels to perform scanning on other channels. In case the STA (300) receives the probe response frame (350) until the probe timer reaches the minimum channel time (320), it may process the received probe response frames (340, 350) after waiting until the probe timer reaches the maximum channel time (330).

The STA (300) may detect PHY-CCA.indication primitive until the probe timer reaches the minimum channel time (320) and may determine whether other frame (e.g., probe response frames (340 and 350)) has been received by the STA (300) until before the minimum channel time (320).

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA (300) may determine that there are probe response frames (340, 350) received by the STA (300) when PHY-CCA.indication is detected to be busy and may determine that there are no probe response frames (340, 350) received by the STA (300) when PHY-CCA.indication is detected to be idle.

In case PHY-CCA.indication is detected to be idle, the STA (300) may set a net allocation vector (NAV) to 0, and the STA (300) may scan a next channel. In case PHY-CCA.indication is detected to be busy, the STA (300) may perform a process on the received probe response frames (340, 350) after the probe timer reaches the maximum channel time (330). After the process on the received probe response frames (340, 350) is done, the STA (300) may set the net allocation vector (NAV) to 0 and may then scan a next channel.

Hereinafter, in embodiments of the present invention, determining whether there are probe response frames (340, 350) received by the STA (300) may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA (300) uses the active scanning method, the STA (300) should perform monitoring to determine whether the parameter of PHY-CCA.indication is busy until the probe timer reaches the minimum channel time The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is another BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo.

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

Figure 4:
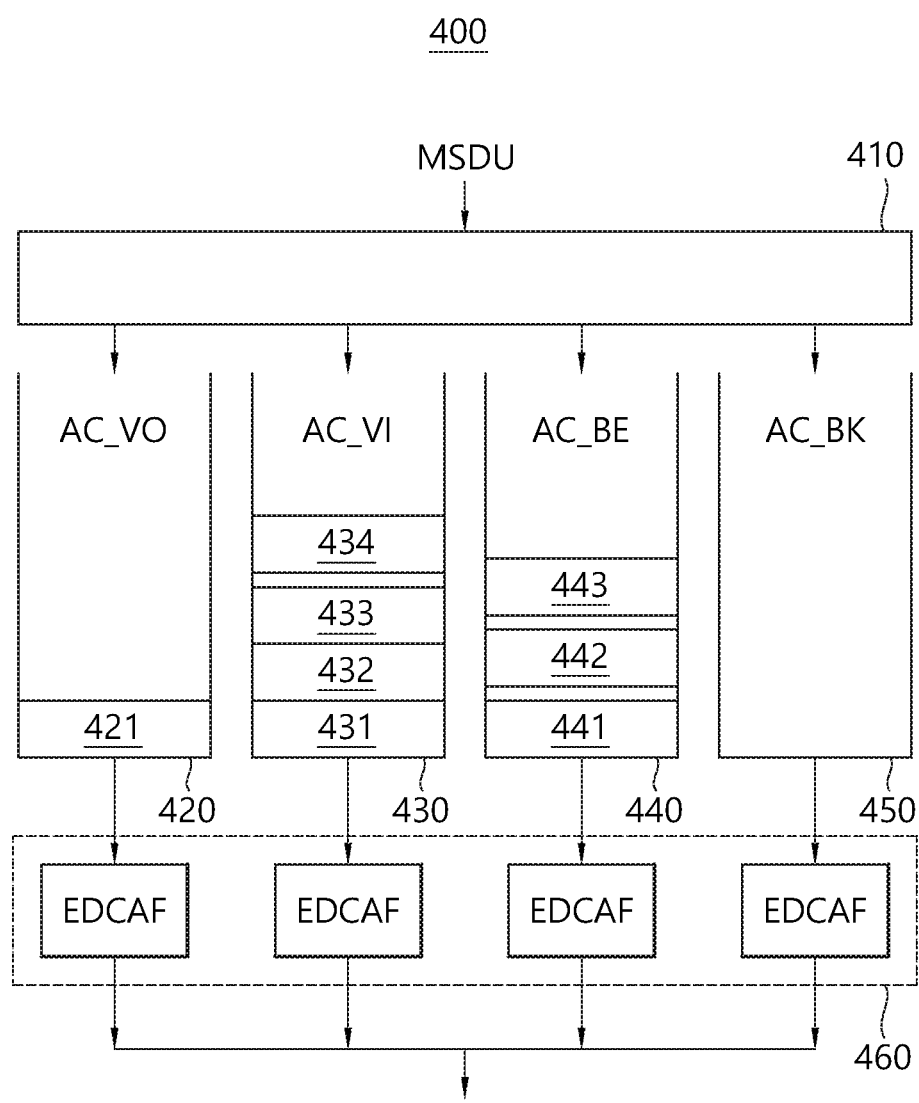
FIG. 4 is a diagram illustrating a conceptual view of an STA supporting EDCA in a wireless LAN system.

FIG. 4 is a diagram illustrating a conceptual view of an STA supporting EDCA in a wireless LAN system. In the WLAN system, an STA (or AP) performing enhanced distributed channel access (EDCA) may perform channel access according to a plurality of user priority levels that are predefined for the traffic data.

The EDCA for the transmission of a Quality of Service (QoS) data frame based on the plurality of user priority levels may be defined as four access categories (hereinafter referred to as 'AC's) (background (AC_BK), best effort (AC_BE), video (AC_VI), and voice (AC_VO)).

An STA performing channel access based on the EDCA may map the traffic data, i.e., MAC service data unit (MSDU), departing from a logical link control (LLC) layer and reaching (or arriving at) a medium access control (MAC) layer, as shown below in Table 1. Table 1 is an exemplary table indicating the mapping between user priority levels and ACs.

TABLE 1

| Priority | User priority | Access category (AC) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

In the present embodiment, a transmission queue and a channel access parameter set may be defined for each AC. The plurality of user priorities may be implemented based on the channel access parameter set which is set differently for each AC.

When performing a backoff procedure for transmitting a frame belonging to each AC, the STA performing channel access based on the EDCA may use each of an arbitration interframe space (AIFS)[AC], a CWmin[AC], and a CWmax[AC] instead of a DCF interframe space (DIFS), a CWmin, and a CWmax, which correspond to parameters for a backoff procedure that is based on a distributed coordination function (DCF).

For reference, the default values of the parameters corresponding to each AC are shown in Table 2 below as an example.

TABLE 2

| AC | CWmin[AC] | CWmax[AC] | AIFS[AC] | TXOP limit[AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The EDCA parameters used in the backoff procedure for each AC may be set as default value or forwarded to each STA with being carried on a beacon frame from an AP to each STA. As AIFS[AC] and CWmin[AC] values decrease, a higher priority is given, and accordingly, the channel access delay shortens, thus allowing for use of more bands in a given traffic environment.

The EDCA parameter set element may include information on channel access parameters for each AC (e.g., AIFS [AC], CWmin[AC], CWmax[AC]).

In the case that a collision occurs between the STAs while the STA transmits a frame, an EDCA backoff procedure of generating a new backoff counter is similar to the existing DCF backoff procedure.

The differentiated backoff procedures for each AC may be performed based on different EDCA parameters. The EDCA parameters may become an important means used to differentiate channel access of various user priorities of traffic.

A proper configuration of the EDCA parameter value defined for each AC may increase the transport effect according to the priority of traffic while optimizing a network performance. Accordingly, an AP may perform the overall management and adjustment function for the EDCA parameters to ensure media accesses to all STAs that participate in the network.

In the present specification, a user priority level predefined (or preassigned) for traffic data (or traffic) may be referred to as a traffic identifier (hereinafter, 'TID').

The transmission priority level of traffic data may be determined on the basis of a user priority level. Referring to Table 1, the traffic identifier (TID) of traffic data having the highest user priority level may be set to 7. That is, traffic data having a traffic identifier (TID) set to 7 may be understood as traffic having the highest transmission priority level.

Referring to FIG. 4, one STA (or AP) (400) may include a virtual mapper (410), a plurality of transmission queues (420-450), and a virtual collision handler (460).

The virtual mapper (410) of FIG. 4 may serve to map a MSDU received from an LLC layer to a transmission queue corresponding to each AC according to Table 1, which is illustrated above.

The plurality of transmission queues (420-450) of FIG. 4 may serve as individual EDCA contention entities for channel access for a wireless medium within one STA (or AP).

For example, a transmission queue (420) of an AC_VO type of FIG. 4 may include one frame (421) for a second STA (not shown). A transmission queue (430) of an AC_VI type may include three frames (431-433) for a first STA (not shown) and one frame (434) for a third STA (not shown) according to the order in which the frames are to be transmitted to a physical layer.

A transmission queue (440) of an AC_BE type of FIG. 4 may include one frame (441) for the second STA (not shown), one frame (442) for the third STA (not shown), and one frame (443) for the second STA (not shown) according to the order in which the frames are to be transmitted to the physical layer. A transmission queue (450) of an AC_BK type may not include a frame to be transmitted to the physical layer.

For example, internal backoff values for the transmission queue (420) of the AC_VO type, the transmission queue (430) of the AC_VI type, the transmission queue (440) of the AC_BE type, and the transmission queue (450) of the AC_BK type may be individually calculated on the basis of Equation 1 below and a channel access parameter set (i.e., AIFS[AC], CWmin[AC], and CWmax[AC] in Table 2) for each AC.

The STA (400) may perform an internal backoff procedure on the basis of an internal backoff value for each of the transmission queues (420, 430, 440, 450). In this case, a transmission queue for which the internal backoff procedure is completed first may be understood as a transmission queue corresponding to a primary AC.

A frame included in a transmission queue corresponding to the primary AC may be transmitted to another entity (e.g., another STA or AP) during a transmission opportunity (hereinafter, 'TXOP'). When there are two or more ACs for which the backoff procedure has been completed at the same time, a collision between the ACs may be coordinated according to a function (EDCA function (EDCAF)) included in the virtual collision handler 460.

That is, when a collision occurs between the ACs, a frame included in an AC having a higher priority level may be transmitted first. In addition, the other ACs may increase a contention window value and may update a value set as a backoff count.

When one frame buffered in the transmission queue of the primary AC is transmitted, the STA may determine whether the STA can transmit the next frame in the same AC and can receive even the ACK of the next frame during the remaining time of the TXOP. In this case, the STA attempts to transmit the next frame after an SIFS time interval.

A TXOP limit value may be set as a default value in the AP and the STA, or a frame associated with the TXOP limit value may be transmitted to the STA from the AP. When the size of a data frame to be transmitted exceeds the TXOP limit value, the STA may fragment the frame into a plurality of smaller frames. Subsequently, the fragmented frames may be transmitted within a range that does not exceed the TXOP limit value.

Figure 5:
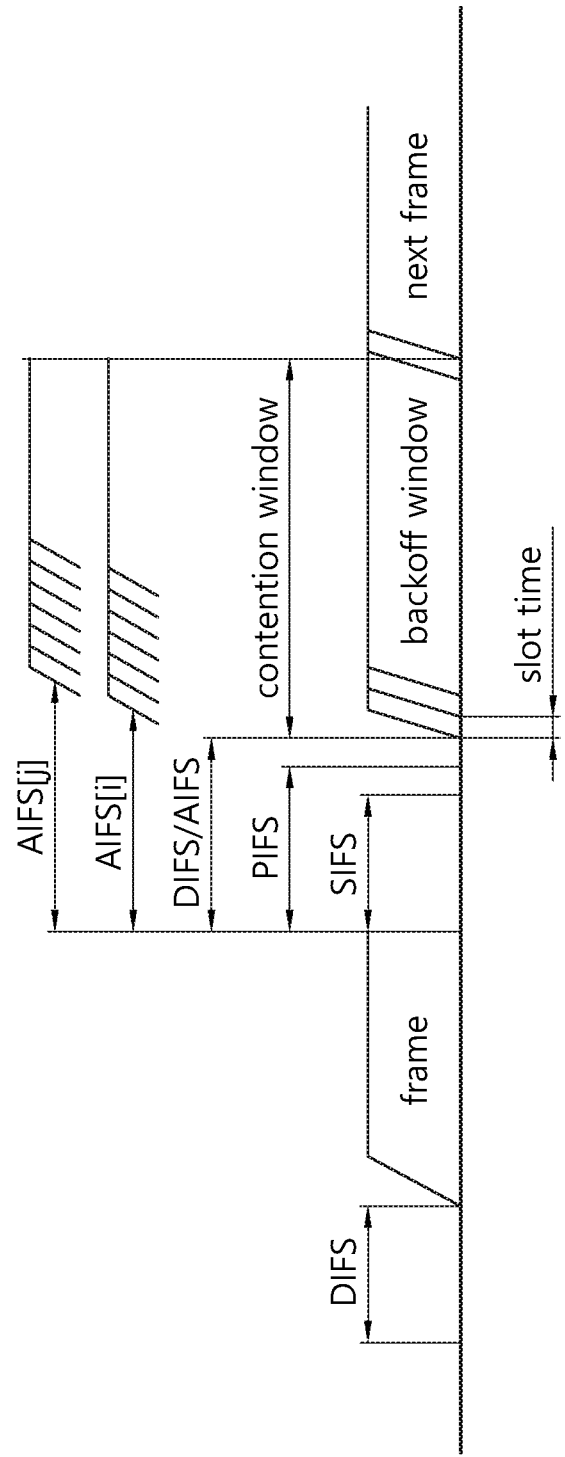
FIG. 5 is a conceptual view illustrating a backoff procedure according to EDCA.

FIG. 5 is a conceptual view illustrating a backoff procedure according to EDCA.

STAs may share a wireless medium based on a distributed coordination function (hereinafter, 'DCF'). The DCF is an access protocol for controlling a collision between STAs and may use a carrier sense multiple access/collision avoidance (hereinafter, 'CSMA/CA').

When it is determined that the wireless medium is not used during a DCF interframe space (DIFS) (i.e., when the wireless medium is idle) by the DCF, an STA may obtain a right (or authority) to transmit an MPDU that is internally determined through the wireless medium. For example, the internally determined MPDU may be understood as the frame included in the transmission queue of the primary AC illustrated in FIG. 4

When it is determined that the wireless medium is used by another STA during the DIFS (i.e., when the wireless medium is busy) by the DCF, the STA may wait until the wireless medium is idle in order to obtain a right to transmit the MPDU that is internally determined through the wireless medium.

Subsequently, the STA may defer channel access for the DIFS from the time at which the wireless medium is switched to the idle state. Then, the STA may wait for a contention window (hereinafter, 'CW') set in a backoff counter.

In order to perform the backoff procedure according to EDCA, each STA may set a backoff value, which is arbitrarily selected within the contention window (CW), in the backoff counter. For example, the backoff value set in the backoff counter of each STA to perform the backoff procedure according to EDCA may be associated with an internal backoff value used in an internal backoff procedure to determine the primary AC for each STA.

In addition, the backoff value set in the backoff counter of each STA may be a value newly set in the backoff counter of each STA for a transmission queue of the primary AC for each STA on the basis of Equation 1 below and a channel access parameter set for each AC (i.e., AIFS[AC], CWmin [AC], and CWmax[AC] in Table 2).

In this specification, time expressing a backoff value, which is selected by each STA, in slot time may be interpreted and understood as the backoff window in FIG. 5.

Each STA may perform a countdown of reducing the backoff window set in the backoff counter by slot time. Among the plurality of STAs, an STA having the relatively shortest backoff window set may obtain a transmission opportunity (hereinafter, 'TXOP'), which is a right to occupy a wireless medium.

During a time period for the TXOP, the remaining STAs may suspend the countdown. The remaining STAs may wait until the time period for the TXOP expires. After the time period for the TXOP expires, the remaining STAs may resume the suspended countdown operation in order to occupy the wireless medium.

According to the transmission method based on the DCF, it is possible to prevent a collision between STAs which may occur when a plurality of STAs transmits frames at the same time. However, the channel access method using the DCF does not have the concept of transmission priority level (i.e., user priority level). That is, using the DCF does not guarantee the quality of service (QoS) of traffic to be transmitted by the STA.

In order to resolve this problem, a hybrid coordination function (hereinafter, 'HCF'), which is a new coordination function, is defined in 802.11e. The newly defined HCF has more enhanced performance than that of the existing channel access performance using the DCF. To enhance the QoS, the HCF may use two different types of channel access methods together, which are HCF-controlled channel access (HCCA) of a polling method and contention-based enhanced distributed channel access (EDCA).

Referring to FIG. 5, it may be assumed that the STA attempts to transmit buffered traffic data. User priority levels set for each traffic data may be differentiated as in Table 1. The STA may include four types (AC_BK, AC_BE, AC_VI, and AC_VO) of output queues mapped to the user priority levels illustrated in Table 1.

The STA may transmit traffic data on the basis of an arbitration interframe space (AIFS) instead of the existing DCF interframe space (DIFS).

Hereinafter, in embodiments of the present invention, a wireless terminal (i.e., STA) may be a device that is capable of supporting both a WLAN system and a cellular system. That is, the wireless terminal may be construed as a UE supporting the cellular system or an STA supporting the WLAN system.

To facilitate the understanding of this specification, interframe spacing, which is mentioned in 802.11, is described. For example, interframe spacing (IFS) may correspond to a reduced interframe space (RIFS), a short interframe space (SIFS), a PCF interframe space (PIFS), a DCF interframe space (DIFS), an arbitration interframe space (AIFS), or an extended interframe space (EIFS).

The interframe spacing (IFS) may be determined depending on attributes specified by the physical layer of the STA regardless of the bit rate of the STA. Among the IFSs, IFSs other than the AIFS may be understood as a fixed value for each physical layer.

The AIFS may be set to a value corresponding to the four types of transmission queues mapped to the user priority levels illustrated in Table 2.

The SIFS has the shortest time gap among the IFSs mentioned above. Accordingly, the SIFS may be used when an STA occupying a wireless medium needs to maintain the occupation of the medium without any interruption by another STA during a period in which a frame exchange sequence is performed.

That is, by using the shortest gap between transmissions within a frame exchange sequence, the STA may be assigned priority to complete an ongoing frame exchange sequence. Also, the STA accessing the wireless medium by using the SIFS may immediately start transmission from the boundary of the SIFS without determining whether the medium is busy.

The duration of an SIFS for a specific physical (PHY) layer may be defined on the basis of a SIFSTime parameter. For example, the SIFS has a value of 16 μs in physical (PHY) layers according to IEEE 802.11a, IEEE 802.11g, IEEE 802.11n, and IEEE 802.11ac.

The PIFS may be used in order to provide an STA with the next highest priority level after the SIFS. That is, the PIFS may be used to obtain priority for accessing the wireless medium.

The DIFS may be used by an STA transmitting a data frame (MPDU) and a management frame (MAC protocol data unit (MPDU)) on the basis the DCF. After a received frame and backoff time expire, when it is determined that the medium is idle by a CS mechanism, the STA may transmit a frame.

Figure 6:
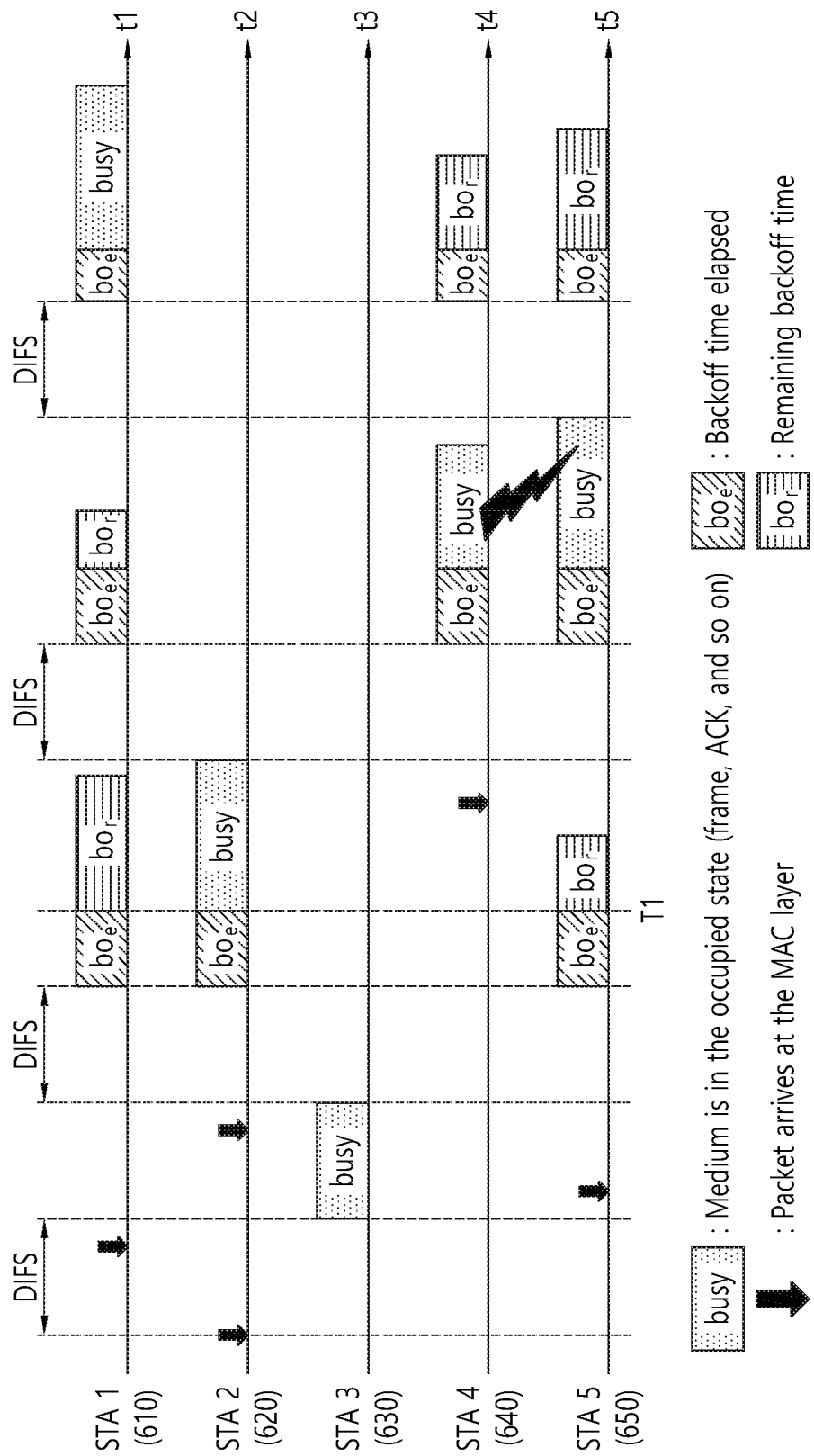
FIG. 6 is a diagram for describing a frame transmission procedure in a WLAN system.

FIG. 6 illustrates a frame transmission procedure in a WLAN system.

Referring to FIGS. 5 and 6, STAs (610, 620, 630, 640, 650) in the WLAN system may individually set a backoff value in a backoff counter for each of the STAs (610, 620, 630, 640, 650) in order to perform a backoff procedure according to EDCA.

Each of the STAs (610, 620, 630, 640, 650) may attempt to perform transmission after waiting for time expressing the set backoff value in slot time (i.e., the backoff window in FIG. 5).

Further, each of the STAs (610, 620, 630, 640, 650) may reduce the backoff window by slot time through a countdown. The countdown for channel access for the wireless medium may be individually performed by each STA.

Each STA may individually set random backoff time (Tb[i]) corresponding to the backoff window in the backoff counter for each STA. Specifically, the backoff time (Tb[i]) corresponds to a pseudo-random integer value and may be calculated by Equation 1 below.

$$T_b[i] = \text{Random}(i) \times \text{SlotTime} \qquad \text{[Equation 1]}$$

Random(i) in Equation 1 denotes a function using uniform distribution and generating a random integer between 0 and CW[i]. CW[i] may be construed as a contention window that is selected between a minimum contention window (CWmin[i]) and a maximum contention window (CWmax[i]).

For example, the minimum contention window (CWmin[i]) and the maximum contention window (CWmax[i]) may correspond to CWmin[AC] and CWmax[AC], which default values in Table 2.

For initial channel access, the STA may select a random integer between 0 and CWmin[i], with CW[i] set to CWmin[i] In this case, the selected random integer may be referred to as a backoff value.

In Equation 1, i may be construed as corresponding to a user priority level in Table 1. That is, traffic buffered for the STA may be construed as corresponding to any one of AC_VO, AC_VI, AC_BE, and AC_BK in Table 1 on the basis of a value set for i in Equation 1.

SlotTime in Equation 1 may be used to provide sufficient time for a preamble of the transmitting STA to be detected by a neighboring STA. SlotTime in Equation 1 may be used to define the PIFS and the DIFS mentioned above. For example, SlotTime may be 9 μs.

For example, when the user priority level (i) is 7, an initial backoff time (Tb[7]) for a transmission queue of the AC_VO type may be time expressing a backoff value, which is selected between 0 and CWmin[AC_VO], in slot time.

When a collision occurs between STAs according to the backoff procedure (or when an ACK frame of a transmitted frame is not received), the STA may newly calculate increased backoff time (Tb[i]') by Equation 2 below.

$$CW_{new}[i] = ((CW_{old}[i]+1) \times PF) - 1 \qquad \text{[Equation 2]}$$

Referring to Equation 2, a new contention window (CWnew[i]) may be calculated on the basis of a previous contention window (CWold[i]). PF in Equation 2 may be calculated in accordance with a procedure defined in IEEE 802.11e. For example, PF in Equation 2 may be set to 2.

In the present embodiment, the increased backoff time (Tb[i]') may be construed as time expressing a random integer (i.e., backoff value), which is selected between 0 and the new contention window (CWnew[i]), in slot time.

CWmin[i], CWmax[i], AIFS[i], and PF values mentioned in FIG. 6 may be signaled from an AP through a QoS parameter set element, which is a management frame. The CWmin[i], CWmax[i], AIFS[i], and PF values may be values preset by the AP and the STA.

Referring to FIG. 6, the horizontal axis (t1 to t5) for first to fifth STAs (610~650) may indicate a time axis. The vertical axis for the first to fifth STAs (610~650) may indicate backoff time.

Referring to FIG. 5 and FIG. 6, if a particular medium is changed from an occupied or busy state to an idle state, the plurality of STAs may attempt to transmit data (or a frame).

Here, to minimize a collision between STAs, each STA may select backoff time (Tb[i]) according to Equation 1 and may attempt transmission after waiting for slot time corresponding to the selected backoff time.

When a backoff procedure is initiated, each STA may count down individually selected backoff counter time by slot times. Each STA may continuously monitor the medium while performing the countdown.

When the wireless medium is determined to be occupied, the STAs may suspend the countdown and may wait. When the wireless medium is determined to be idle, the STAs may resume the countdown.

Referring to FIG. 6, when a frame for the third STA (630) reaches the MAC layer of the third STA (630), the third STA (630) may determine whether the medium is idle during a DIFS. When it is determined that the medium is idle during the DIFS, the third STA (630) may transmit the frame to the AP (not shown). Here, although FIG. 6 shows the DIFS as an interframe space (IFS), it should be note that this specification will not be limited thereto.

While the frame is transmitted from the third STA (630), the remaining STAs may check the occupancy state of the medium and may wait for the transmission period of the frame. A frame may reach the MAC layer of each of the first STA (610), the second STA (620), and the fifth STA (650). When it is determined that the medium is idle, each STA may wait for the DIFS and may then count down backoff time individually selected by each STA.

FIG. 6 shows that the second STA (620) selects the shortest backoff time and the first STA (610) selects the longest backoff time. FIG. 6 shows that the remaining backoff time for the fifth STA (650) is shorter than the remaining backoff time for the first STA (610) at the time (T1) when a backoff procedure for the backoff time selected by the second STA (620) is completed and the transmission of a frame starts.

When the medium is occupied by the second STA (620), the first STA (610) and the fifth STA (650) may suspend the backoff procedure and may wait. When the second STA (620) finishes occupying the medium (i.e., when the medium returns to be idle), the first STA (610) and the fifth STA (650) may wait for the DIFS.

Subsequently, the first STA (610) and the fifth STA (650) may resume the backoff procedure on the basis of the suspended remaining backoff time. In this case, since the remaining backoff time for the fifth STA (650) is shorter than the remaining backoff time for the first STA (610), the fifth STA (650) may complete the backoff procedure before the first STA (610).

Meanwhile, referring to FIG. 6, when the medium is occupied by the second STA (620), a frame for the fourth STA (640) may reach the MAC layer of the fourth STA (640). When the medium is idle, the fourth STA (640) may wait for the DIFS. Subsequently, the fourth STA (640) may count down the backoff time selected by the fourth STA (640).

Referring to FIG. 6, the remaining backoff time for the fifth STA (650) may coincidently match the remaining backoff time for the fourth STA (640). In this case, a collision may occur between the fourth STA (640) and the fifth STA (650). If the collision occurs between the STAs, both the fourth STA (640) and the fifth STA (650) may not receive an ACK and may fail to transmit data.

Accordingly, the fourth STA (540) and the fifth STA (550) may individually calculate a new contention window (CWnew[i]) according to Equation 2. Subsequently, the fourth STA (540) and the fifth STA (550) may individually count down backoff time newly calculated according to Equation 2.

When then medium is occupied state due to transmission by the fourth STA (540) and the fifth STA (550), the first STA (510) may wait. Subsequently, when the medium is idle, the first STA (510) may wait for the DIFS and may then resume backoff counting. After the remaining backoff time for the first STA (510) elapses, the first STA (510) may transmit a frame.

The CSMA/CA mechanism may include virtual carrier sensing in addition to physical carrier sensing in which an AP and/or STA directly senses a medium.

Virtual carrier sensing is used to address any problem that may occur in access to a medium, such as a hidden node problem. For virtual carrier sensing, the MAC of a WLAN system uses a network allocation vector (NAV).

The NAV is a value representing remaining time for a medium to be available, which is indicated by an AP and/or STA currently using the medium or having the right to use the medium to another AP and/or STA.

Therefore, a value set as the NAV corresponds to a period in which an AP and/or STA transmitting a frame is scheduled to use a medium, and an STA receiving the NAV value is prohibited from accessing the medium during the period. The NAV may be set, for example, according to the value of a duration field in a MAC header.

Figure 7:
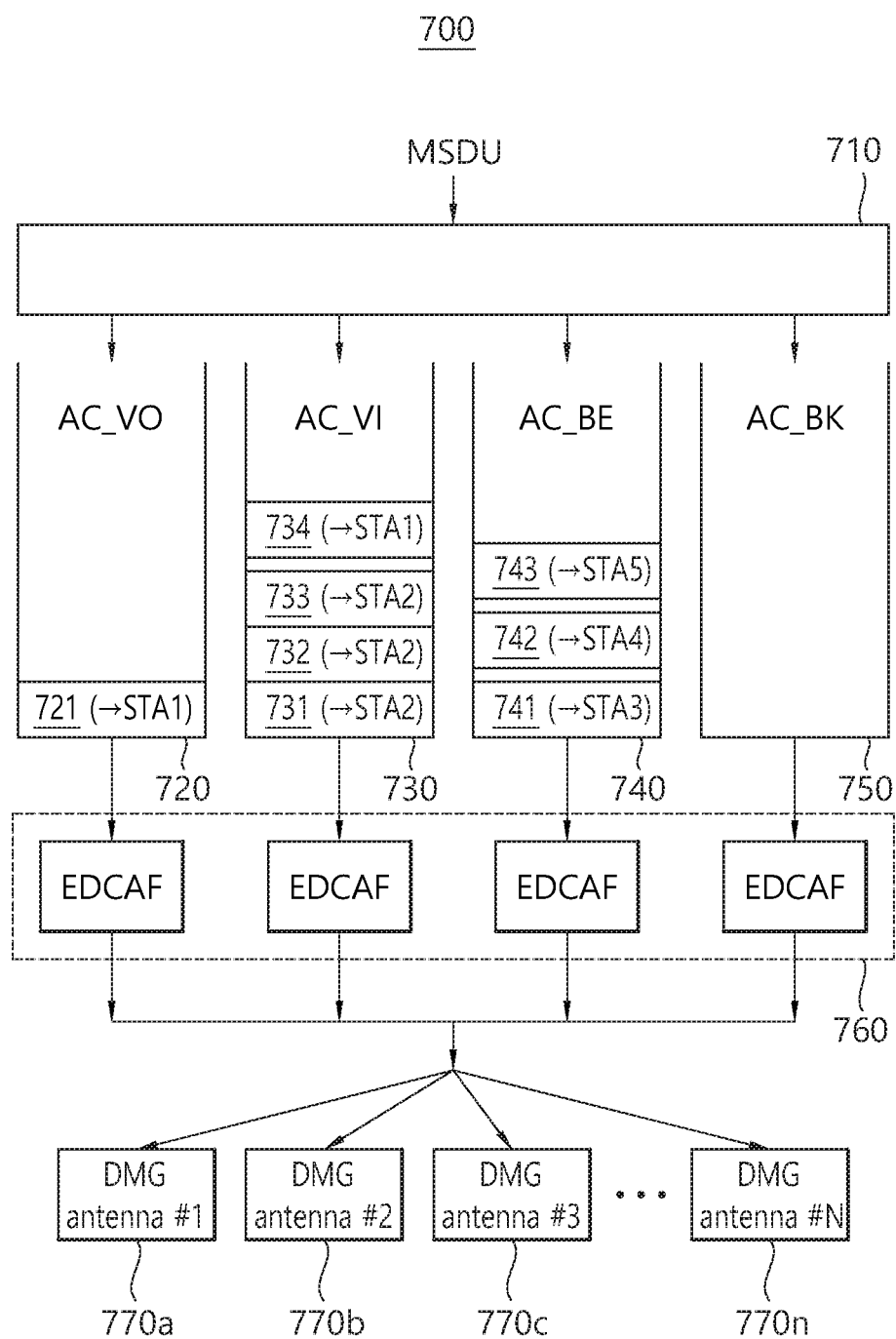
FIG. 7 is a diagram illustrating a conceptual view of an STA transmitting a frame in a WLAN system according to an exemplary embodiment of this specification.

FIG. 7 is a conceptual view illustrating a wireless terminal that transmits a frame in a WLAN system according to one embodiment.

Referring to FIG. 7, the wireless terminal (700) according to the present embodiment may include a virtual mapper (710), a plurality of transmission queues (720~750), a virtual collision handler (760), and a plurality of directional antenna modules (770a~770n).

Referring to FIGS. 1 to 7, descriptions of the virtual mapper (710), the plurality of transmission queues (720~750), and the virtual collision handler (760) in FIG. 7 are substantially the same as the descriptions of the virtual mapper (410), the plurality of transmission queues (420~450), and the virtual collision handler (460) in FIG. 4.

According to the embodiment of FIG. 7, the wireless terminal (700) may have an internal structure in which one set of transmission queues (720, 730, 740, 750) in the wireless terminal is associated with the plurality of directional antenna modules (770a~770n).

A directional multi-gigabit (DMG) antenna according to the present embodiment may include a plurality of physical antennas. Further, the DMG antenna according to the present embodiment may be construed as a set of a plurality of physical (or logical) antennas arranged in one direction.

For the clear and concise description of the present specification, a first directional antenna module (770a) may include a first DMG antenna associated with a first user terminal (not shown), and a second directional antenna module (770b) may include a second DMG antenna associated with a second user terminal (not shown).

Further, a third directional antenna module (770c) may include a third DMG antenna associated with a third user terminal (not shown), and an Nth directional antenna module (770n) (n is a natural number) may include an Nth DMG antenna associated with an Nth STA (N is a natural number).

Hereinafter, it is assumed that the wireless terminal (700) of FIG. 7 includes five directional antenna modules (770a~770e). The wireless terminal (700) of FIG. 7 may associate a plurality of data frames (721, 731~734, 741~743) with the plurality of directional antenna modules (770a~770n) on the basis of receive address (hereinafter, 'RA') information configured for each of the plurality of data frames (721, 731~734, 741~743).

A first data frame (721) may be buffered in a transmission queue (720) of the AC_VO type. For example, the first data frame (721) may be construed as an MPDU including RA information indicating the first user terminal (not shown).

Second to fifth data frames (731~734) may be buffered in a transmission queue (730) of the AC_VI type. For example, the second to fourth data frames (731, 732, 733) may be construed as MPDUs including RA information indicating the second user terminal (not shown). For example, the fifth data frame (734) may be construed as an MPDU including RA information indicating the first user terminal (not shown).

Sixth to eighth data frames (741~743) may be buffered in a transmission queue (740) of the AC_BE type. For example, the sixth data frame (741) may be construed as an MPDU including RA information indicating the third user terminal (not shown).

For example, the seventh data frame (742) may be construed as an MPDU including RA information indicating a fourth user terminal (not shown). For example, the eighth data frame (743) may be construed as an MPDU including RA information indicating a fifth user terminal (not shown).

It should be noted that the plurality of data frames included in the transmission queues illustrated in FIG. 7 is merely an example, and the present specification is not limited thereto.

Each directional antenna module (770a~770n) according to the exemplary embodiment of this specification may receive data frames being buffered to a plurality of transmission queues in accordance with the receive address (RA) information that is included in the corresponding data frames.

For example, a first directional antenna module (770a) may receive a first data frame (721) and a fifth data frame (734). And, a second directional antenna module (770b) may receive second to fourth data frames (731, 732, 733).

A third directional antenna module (770c) may receive a sixth data frame (741). A fourth directional antenna module (770d) may receive a seventh data frame (742). And, a fifth directional antenna module (770e) may receive an eighth data frame (743).

A legacy STA may determine the channel status by performing a comparison between a power level of a signal that is received from a physical layer and a predetermined threshold value based on a clear channel assessment (CCA) operation.

For example, in case the power level of the signal being received through the channel is smaller than the threshold value, the corresponding channel status may be determined to be idle. In case the power level of the signal being received through the channel is greater than the threshold value, the corresponding channel status may be determined to be busy.

The STA (700) including the plurality of directional antenna modules (770a~770n) according to the exemplary embodiment of this specification may cover multiple directions. The STA (700) according to the exemplary embodiment of this specification may perform CCA operations for multiple directions during a predetermined period of time. Accordingly, the STA may individually (or separately) determine multiple channel statuses associated with the plurality of directional antenna modules (770a~770n) for a plurality of user STAs (not shown).

Hereinafter, the CCA operations being simultaneously performed for the multiple directions by the STA according to the exemplary embodiment of this specification may be referred to as directional clear channel assessment (CCA) operations.

For example, by performing the directional CCA operations, the STA may determine a channel corresponding to a specific direction, among the multiple directions, to be in a busy state, and the STA may determine a channel corresponding to another direction to be in an idle state.

The plurality of directional antenna modules (770a~770n) according to the exemplary embodiment of this specification may be associated with the channels of specific directions for each user STA (not shown).

For example, based on a result of performing the directional CCA operation, a channel of a first direction for a first user STA (not shown) may be determined to be in a busy state. And, based on a result of performing the directional CCA operation, a channel of a second direction for a second user STA (not shown) may be determined to be in an idle state. Similarly, based on a result of performing the directional CCA operation, a channel of an $N^{th}$ direction for an $N^{th}$ user STA (not shown) may be determined to be in an idle state.

The STA according to the exemplary embodiment of this specification may transmit a data frame being included in a transmission queue of a primary AC based on at least one directional antenna module being associated with at least one channel that is determined to be in an idle state.

Additionally, the STA according to the exemplary embodiment of this specification may transmit a data frame being included in a transmission queue of a primary AC and a data frame being included in a transmission queue of a secondary AC based on at least one directional antenna module being associated with at least one channel that is determined to be in an idle state.

Figure 8:
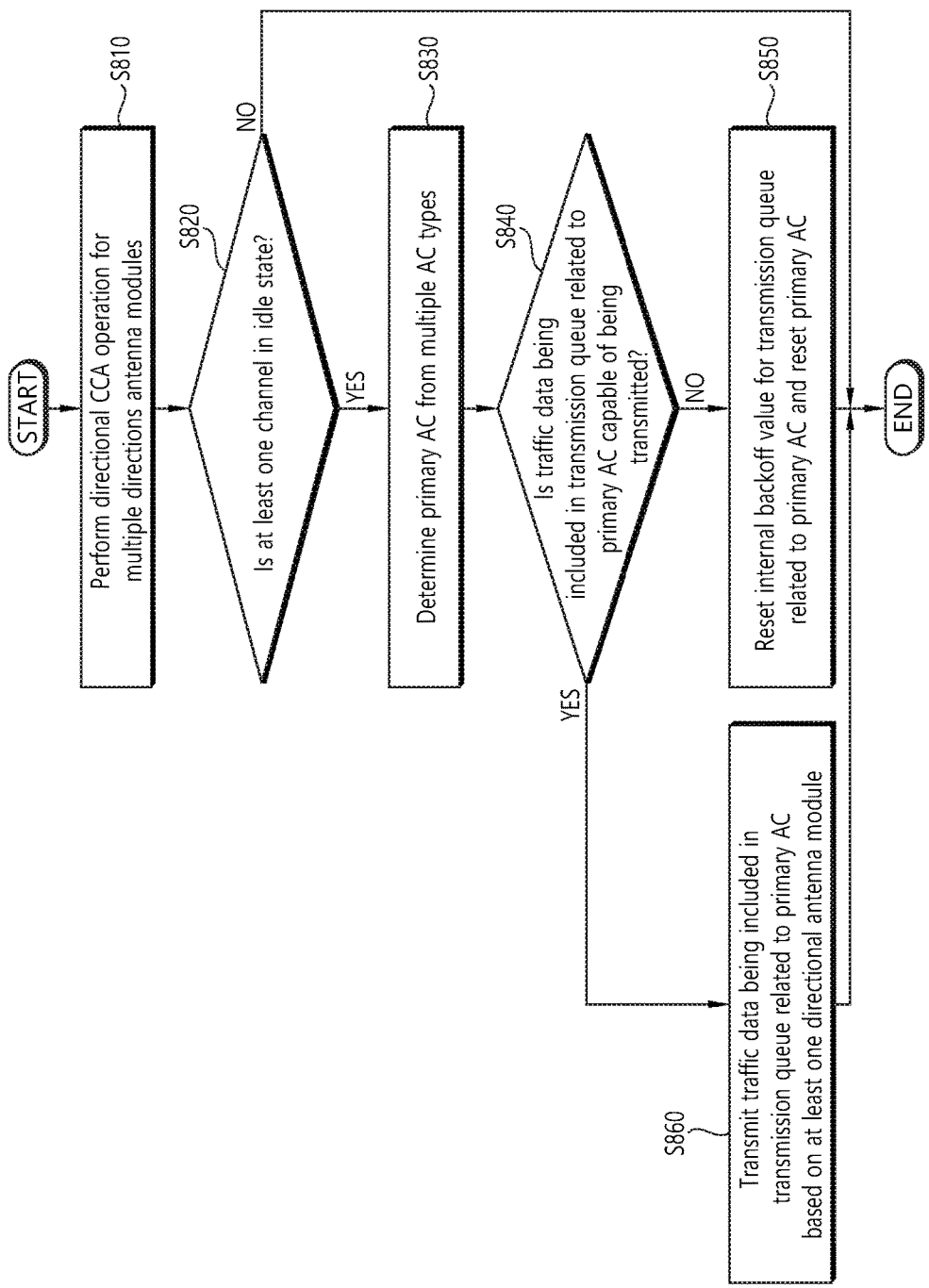
FIG. 8 is a flow chart illustrating a method for transmitting a frame in a WLAN system according to an exemplary embodiment of this specification.

FIG. 8 is a flow chart illustrating a method for transmitting a frame in a WLAN system according to an exemplary embodiment of this specification.

Referring to FIG. 1 to FIG. 8, in step S810, a wireless device (or wireless terminal) according to an exemplary embodiment of this specification may perform directional CCA operations for a plurality of directional antennas during a predetermined period of time. For example, the predetermined period of time may correspond to a PIFS.

In step S820, the wireless device may determine the channel status of each channel for each user STA by performing directional CCA operations.

If all of the channels being associated with the wireless device are determined to be in a busy state, the process is ended. However, if at least one channel being associated with the wireless device is determined to be in an idle state, step S830 is performed.

In step S830, the wireless device may determine a primary AC through an internal backoff procedure, which was previously mentioned with reference to FIG. 4. For example, the wireless device may determine an AC_VI type, among the plurality of AC types, as the primary AC. In this case, the remaining AC types (AC_VO, AC_BE, AC_BK) may be determined as the secondary AC.

In step S840, the wireless device may determine whether or not traffic data being included in the transmission queue of the primary AC can be transmitted based on at least one directional antenna module. In this case, the at least one directional antenna module may be associated with the at least one directional antenna module that is determined to be in an idle state.

If it is determined that the transmission of the traffic data being included in the transmission queue of primary AC cannot be performed, step S850 may be performed.

In step S840 of FIG. 8, the case where it is determined that the transmission of the traffic data being included in the transmission queue of primary AC cannot be performed is as described below.

Referring to FIG. 7 and FIG. 8, by performing step S820, a first channel for a first user STA, a second channel for a second user STA, and a fifth channel for a fifth user STA may be determined to be in a busy state. And, a third channel of a third user STA and a fourth channel of a fourth user STA may be determined to be is an idle state.

By performing step S830, the primary AC may be determined as the AC_VI type, for which the internal backoff procedure is to be completed first. Thereafter, by performing step S840, it may be determined whether or not the transmission of traffic data (731~734) being included in the transmission queue (730) of the AC_VI type can be transmitted based on the first directional antenna module (770a) that is associated with the first channel and the second directional antenna module (770b) that is associated with the second channel.

As described above, the second to fourth traffic data (731~733) being included in the transmission queue (730) of the AC_VI type, which corresponds to the primary AC, may be received by the second directional antenna module (770b) that is associated with the second channel. Also, the fifth traffic data (734) being included in the transmission queue (730) of the AC_VI type may be received by the first directional antenna module (770a) that is associated with the first channel.

Since the first channel is determined to be in the busy state in accordance with the above-described directional CCA operation, the wireless device may determine that the transmission of the fifth traffic data (734) using the first directional antenna module (770a) cannot be performed.

Additionally, since the second channel is determined to be in the busy state in accordance with the above-described directional CCA operation, the wireless device may determine that the transmission of the second to fourth traffic data (731~733) using the second directional antenna module (770b) cannot be performed.

In step S850, the wireless device may reset (or reconfigure) an internal backoff value for the transmission queue of the primary AC, which is determined in the previous step. The wireless device may re-determine the primary AC by performing the internal backoff procedure once again.

For example, the wireless device may rest only the internal backoff value for the transmission queue (e.g., 730) of the primary AC, which is determined in the previous step, while maintaining the internal backoff values for the transmission queues (e.g., 720, 740, 750) of the secondary AC without any variation.

In this case, the backoff value that was used in the previous step may be re-used, or a value that is smaller than the backoff value that was used in the previous step may be used as the internal backoff value for the transmission queue (e.g., 730) of the primary AC, which is determined in the previous step.

As another example, the internal backoff values for the transmission queues (e.g., 720, 740, 750) of the secondary AC and the internal backoff value for the transmission queue (e.g., 730) of the primary AC, which is determined in the previous step, may all be reset.

In this case, the backoff value that was used in the previous step may be re-used, or a value that is smaller than the backoff value that was used in the previous step may be used as the internal backoff values for the transmission queues (e.g., 720, 730, 740, 750) of all ACs.

Although it is not shown in FIG. 8, if it is determined that the transmission of the traffic data (731, 732, 733, 734) being included in the transmission queue (730) of the primary AC cannot be performed, the wireless device may transmit traffic data being included in the multiple transmission queues (e.g., 720, 740, 750) corresponding to the secondary AC by using at least one of the directional antenna modules (e.g., 770a, 770b) that are determined to be in the idle state.

For example, the wireless device may transmit a sixth traffic data (741) being included in the third transmission queue (740), which does not correspond to the primary AC, based on the third directional antenna module (e.g., 770c), which is determined to be in the idle state.

For example, the wireless device may transmit a seventh traffic data (742) being included in the third transmission queue (740), which does not correspond to the primary AC, based on the fourth directional antenna module (e.g., 770d), which is determined to be in the idle state.

For example, the wireless device cannot transmit an eighth traffic data (743) being included in the third transmission queue (740), which does not correspond to the primary AC, based on the fifth directional antenna module (e.g., 770e), which is determined to be in the busy state.

In step S840 of FIG. 8, the case where it is determined that the transmission of the traffic data being included in the transmission queue of primary AC can be performed is as described below.

Referring to FIG. 7 and FIG. 8, by performing step S820, a first channel for a first user STA and a second channel for a second user STA may be determined to be is an idle state. And, a third channel of a third user STA, a fourth channel of a fourth user STA, and a fifth channel for a fifth user STA may be determined to be in a busy state.

By performing step S830, the primary AC may be determined as the AC_VI type, for which the internal backoff procedure is to be completed first. Thereafter, by performing step S840, it may be determined whether or not the transmission of traffic data (731~734) being included in the transmission queue (730) of the AC_VI type can be transmitted based on the first directional antenna module (770a) that is associated with the first channel and the second directional antenna module (770b) that is associated with the second channel.

As described above, the second to fourth traffic data (731~733) being included in the transmission queue (730) of the AC_VI type, which corresponds to the primary AC, may be received by the second directional antenna module (770b) that is associated with the second channel. Also, the fifth traffic data (734) being included in the transmission queue (730) of the AC_VI type may be received by the first directional antenna module (770a) that is associated with the first channel.

Since the first channel is determined to be in the idle state in accordance with the above-described directional CCA operation, the wireless device may determine that the transmission of the fifth traffic data (734) using the first directional antenna module (770a) can be performed.

Additionally, since the second channel is determined to be in the idle state in accordance with the above-described directional CCA operation, the wireless device may determine that the transmission of the second to fourth traffic data (731~733) using the second directional antenna module (770b) can be performed.

If it is determined that the transmission of traffic data being included in the transmission queue of the primary AC can be performed based on the at least one directional antenna module that is determined to be in the idle state, step S860 may be performed.

In step S860, the wireless device may transmit the plurality of traffic data being included in the primary AC along separate directions for each user STA by using at least one directional antenna module, which is determined to be in the idle state. In this case, the at least one directional antenna module may be set (or configured) to have separate directions for each user STA.

Although it is not shown in FIG. 8, the wireless device may transmit both the traffic data being included in the transmission queue of the primary AC and the traffic data being included in the transmission queue of the secondary AC by using at least one directional antenna module, which is determined to be in the idle state.

Figure 9:
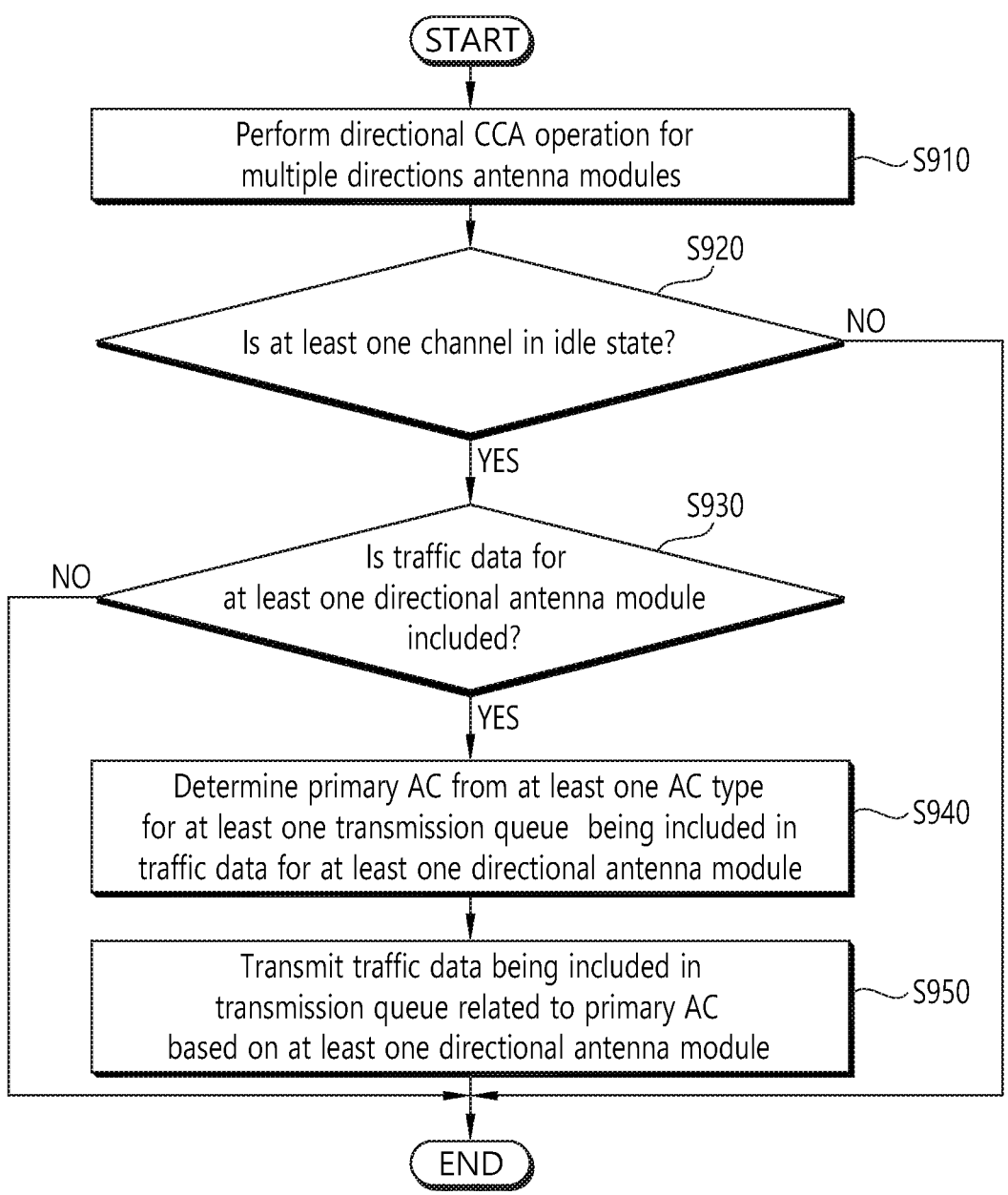
FIG. 9 is a flow chart illustrating a method for transmitting a frame in a WLAN system according to another exemplary embodiment of this specification.

FIG. 9 is a flow chart illustrating a method for transmitting a frame in a WLAN system according to another exemplary embodiment of this specification.

Referring to FIG. 1 to FIG. 9, the description of step S910 of FIG. 9 may be substituted by the description of step S810 of FIG. 8. Additionally, the description of step S920 of FIG. 9 may be substituted by the description of step S820 of FIG. 8.

For a brief description of FIG. 9, it will be assumed that, by performing step S920 of FIG. 9, a first channel for a first user STA and a fourth channel for a fourth user STA are determined to be in a busy state.

Additionally, it will also be assumed that a second channel for a second user STA, a third channel for a third user STA, and a fifth channel for a fifth user STA are determined to be in an idle state.

In step S930, a wireless device according to another exemplary embodiment of this specification may determine whether or not traffic data for at least one directional antenna module is included in a transmission queue of the wireless device.

In this case, the at least one directional antenna module may be understood as directional antenna modules (e.g., 770b, 770c, 770e) that are associated with the second channel, the third channel, and the fifth channel, which are determined to be in the idle state, in step S920.

Additionally, a transmission queue being associated with the at least one directional antenna module (e.g., 770b, 770c, 770e) may be understood as a transmission queue including traffic data that is to be received by the at least one directional antenna module (e.g., 770b, 770c, 770e).

In this case, the transmission queue being associated with at least one directional antenna module (e.g., 770b, 770c, 770e) may be understood as a transmission queue (e.g., 730) of the AC_VI type and a transmission queue (e.g., 740) of the AC_BE type.

If the traffic data for the at least one directional antenna module is not included in the transmission queue of the wireless device, the process may be ended.

If the traffic data (e.g., 731-733, 741, 743) for the at least one directional antenna module is included in the transmission queue (730, 740) of the wireless device, step S940 may be performed.

In step S940, the wireless device according to the other exemplary embodiment of this specification may determine the primary AC from the AC types (i.e., AC_VI, AC_BE) of the multiple transmission queues (730, 740) including the traffic data (e.g., 731-733, 741, 743) for at least one directional antenna module (e.g., 770b, 770c, 770e).

In other words, the wireless device according to the other exemplary embodiment of this specification may determine the primary AC from the AC_VI type and the AC_BE type, without considering the AC_VO type and the AC_BK type.

More specifically, the wireless device according to the other exemplary embodiment of this specification may determine the primary AC based on Equation 1 and a channel access parameter set (i.e., AIFS[AC], CWmin[AC], CWmax[AC] of Table 2) for the selected AC (i.e., AC_VI, AC_BE).

In step S950, the wireless device according to the other exemplary embodiment of this specification may transmit the traffic data being included in the primary AC by using the at least one directional antenna module that is determined to be in the idle state.

More specifically, according to the other exemplary embodiment of this specification, the primary AC may be determined from the AC types of the at least one transmission queue being included in a data frame that can be transmitted through at least one directional antenna module for a channel, which is determined to be in the idle state.

In other words, according to the other exemplary embodiment of this specification, a situation where the traffic data being included in a primary AC cannot be transmitted, which occurs in the related art, may be prevented in advance. Accordingly, according to the other exemplary embodiment of this specification, it may be understood that an enhanced WLAN system having a reduced overhead that is required for the frame transmission can be provided.

Figure 10:
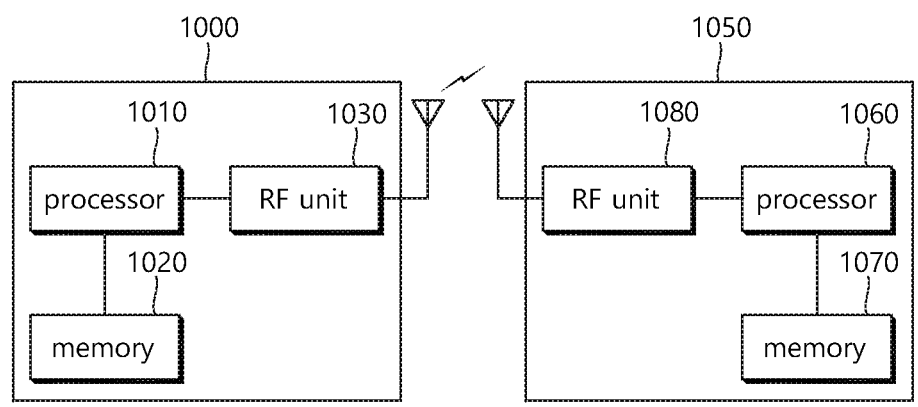
FIG. 10 is a block view illustrating a wireless device to which the exemplary embodiment of this specification can be applied.

FIG. 10 is a block view illustrating a wireless device to which the exemplary embodiment of this specification can be applied.

Referring to FIG. 10, as an STA that can implement the above-described exemplary embodiment, the wireless device may correspond to an AP or a non-AP station (STA). The wireless device may correspond to the above-described user or may correspond to a transmitting device transmitting a signal to the user.

The AP (1000) includes a processor (1010), a memory (1020), and a radio frequency (RF) unit (1030).

The RF unit (1030) is connected to the processor (1010), thereby being capable of transmitting and/or receiving radio signals.

The processor (1010) implements the functions, processes, and/or methods proposed in this specification. For example, the processor (1010) may be implemented to perform the operations according to the above-described exemplary embodiments of this specification. More specifically, among the operations that are disclosed in the exemplary embodiments of FIG. 1 to FIG. 9, the processor (1010) may perform the operations that may be performed by the AP.

The non-AP STA (1050) includes a processor (1060), a memory (1070), and a radio frequency (RF) unit (1080).

The RF unit (1080) is connected to the processor (1060), thereby being capable of transmitting and/or receiving radio signals.

The processor (1060) implements the functions, processes, and/or methods proposed in this specification. For example, the processor (1060) may be implemented to perform the operations of the non-AP STA according to the above-described exemplary embodiments of this specification. The processor (1060) may perform the operations of the non-AP STA, which are disclosed in the exemplary embodiments of FIG. 1 to FIG. 9.

The processor (1010, 1060) may include an application-specific integrated circuit (ASIC), another chip set, a logical circuit, a data processing device, and/or a converter converting a baseband signal and a radio signal to and from one another. The memory (1020, 1070) may include a read-only memory (ROM), a random access memory (RAM), a flash memory, a memory card, a storage medium, and/or another storage device. The RF unit (1030, 1080) may include one or more antennas transmitting and/or receiving radio signals.

When the exemplary embodiment is implemented as software, the above-described method may be implemented as a module (process, function, and so on) performing the above-described functions. The module may be stored in the memory (1020, 1070) and may be executed by the processor (1010, 1060). The memory (1020, 1070) may be located inside or outside of the processor (1010, 1060) and may be connected to the processor (1010, 1060) through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for transmitting a frame in a wireless LAN system, the method comprising:
    determining, by a wireless device including a first directional antenna module being related to a first channel for a first user device and a second directional antenna module being related to a second channel for a second user device, whether or not at least one channel of the first channel or the second channel is capable of being used based on a directional clear channel assessment (CCA) for separately checking channel statuses;
    in response to determining that the at least one channel is capable of being used, determining, by the wireless device, an access category (AC) type that first completes a first backoff procedure from a plurality of AC types as a primary AC;
    determining, by the wireless device, whether or not traffic data being included in a transmission queue related to the primary AC is capable of being transmitted based on at least one directional antenna module that is related to the at least one channel; and
    in response to determining that the traffic data is not capable of being transmitted, determining, by the wireless device, the primary AC once again from the plurality of AC types by performing a second backoff procedure,
    wherein determining whether or not the traffic data is capable of being transmitted comprises:
    based on the first channel being in a busy state, the second channel being in an idle state, and a receive address of the traffic data being related to the first user device, determining, by the wireless device, that the traffic data is incapable of being transmitted; and
    based on the first channel being in a busy state, the second channel being in an idle state, and a receive address of the traffic data being related to the second user device, determining, by the wireless device, that the traffic data is capable of being transmitted.

2. The method of claim 1, wherein determining the primary AC once again from the plurality of AC types comprises:
    resetting only a backoff value for the primary AC in order to perform the second backoff procedure.

3. The method of claim 2, wherein the backoff value being reset for the primary AC is set as the same value as the value used in the first backoff procedure, or wherein the backoff value being reset for the primary AC is set as a value being smaller than the value used in the first backoff procedure.

4. The method of claim 1, wherein determining the primary AC once again from the plurality of AC types comprises:
    resetting all backoff values for the plurality of AC types in order to perform the second backoff procedure.

5. The method of claim 1, wherein determining whether or not the at least one channel is capable of being used based on a directional CCA comprises:
    when a signal being received by a physical layer of the wireless device through the first channel is greater than a predetermined threshold value, determining, by the wireless device, the first channel to be in a busy state; and
    when a signal being received by the physical layer of the wireless device through the first channel is smaller than the predetermined threshold value, determining, by the wireless device, the first channel to be in an idle state.

6. The method of claim 1, wherein determining the AC type that first completes the first backoff procedure from the plurality of AC types as the primary AC comprises:
    performing a separate countdown of first to fourth backoff values being set for each of an AC_voice (VO) type, an AC_video (VI) type, an AC_best effort (BE) type, and an AC_background (BK) type corresponding to the plurality of AC types; and
    determining a backoff value, among the first to fourth backoff values, that first reaches '0' as the primary AC type.

7. The method of claim 1, wherein the wireless device further comprises:
    a third directional antenna module being related to a third channel for a third user STA.

8. A wireless device including a first directional antenna module being related to a first channel for a first user device and a second directional antenna module being related to a second channel for a second user device, the wireless device comprising:
    a transceiver transceiving radio signals; and
    a processor being operatively connected to the transceiver,
    wherein the processor is configured:
    to determine whether or not at least one channel of the first channel or the second channel is capable of being used based on a directional clear channel assessment (CCA) for separately checking channel statuses,
    in response to determining that the at least one channel is capable of being used, to determine an access category (AC) type that first completes a first backoff procedure from a plurality of AC types as a primary AC,
    to determine whether or not traffic data being included in a transmission queue related to the primary AC is capable of being transmitted based on at least one directional antenna module that is related to the at least one channel, and
    in response to determining that the traffic data is not capable of being transmitted, to determine the primary AC once again from the plurality of AC types by performing a second backoff procedure,
    wherein the processor is further configured:
    based on the first channel being in a busy state, the second channel being in an idle state, and a receive address of the traffic data being related to the first user device, to determine, by the wireless device, that the traffic data is incapable of being transmitted; and
    based on the first channel being in a busy state, the second channel being in an idle state, and a receive address of the traffic data being related to the second user device, to determine, by the wireless device, that the traffic data is capable of being transmitted.

* * * * *